United States Patent [19]
Carlson et al.

[11] 3,747,156
[45] July 24, 1973

[54] FILTER CHAMBER FOR SCRAPING MACHINE

[75] Inventors: Alfred D. Carlson; Joseph G. Kasper, both of Minneapolis, Minn.

[73] Assignee: Tennant Company, Minneapolis, Minn.

[22] Filed: Nov. 4, 1971

[21] Appl. No.: 195,874

Related U.S. Application Data
[62] Division of Ser. No. 852,326, Aug. 22, 1969, Pat. No. 3,639,940.

[52] U.S. Cl. ............................................... 15/349
[51] Int. Cl. .............................. A471 9/10, A471 9/20
[58] Field of Search ....................... 15/340, 348, 349

[56] References Cited
UNITED STATES PATENTS 3,189,931  6/1965  Peabody ........................... 15/349 X
3,304,572  2/1967  Wendel ................................. 15/340
3,604,051  9/1971  Wendel et al ......................... 15/340

*Primary Examiner*—William I. Price
*Assistant Examiner*—C. K. Moore
*Attorney*—Ralph L. Dugger, Nickolas E. Westman et al.

[57] ABSTRACT

A sweeping machine which has a surface maintenance tool, a debris receptacle for receiving material from the maintenance tool, and a filter compartment, and an airflow from the maintenance tool through the debris compartment and through the filter compartment, wherein the connection between the debris compartment and filter compartment comprises two tubular members, one of which is larger than and surrounds the other, and a diaphragm connection between the two tubular members to permit relative movement between the two tubular members without breaking the airflow connection.

3 Claims, 5 Drawing Figures

PATENTED JUL 24 1973 3,747,156

FILTER CHAMBER FOR SCRAPING MACHINE

This is a division of application Ser. No. 852,326, filed Aug. 22, 1969 now U.S. Pat. No. 3,639,940.

BACKGROUND OF THE INVENTION

1. Field of the Invention

The present invention has relation to devices for shaking filters for vacuum action sweeping machines.

2. Prior Art

One of the problems in mobile sweeping machines which use a vacuum source for drawing fine dust through filter bags is that the bags will load up with the dust quite quickly and the air flow is greatly reduced. Various shakers have been advanced for shaking the dust off these filter bags, but the problem persists because most of the time the vibration or shaking of the filter bags takes place at the same time vacuum is being applied to the bags and the dust just plain doesn't fall off the bags.

Further, most of the shakers involve a mechanical shaking or jostling of the bag directly where something actually physically strikes the bags, and this can cause the filter bags to wear out quite quickly.

SUMMARY OF THE INVENTION

A filter chamber including a system for vibrating or shaking filter bags in the chamber which utilizes an eccentric weight driven by an electric motor for vibration, so that the bags can be shaken without being directly contacted by a rotating member. The bags are suspended under spring tension and the vibrating member is attached to the spring members to enhance the vibration. Control means are provided which are interlocked to shut off the vacuum created airflow to the filter compartment at the same time the vibration takes place, so that the dust on the sides of the filter bag is not held on by vacuum and will tend to fall off during vibration. The mobile unit shown has a flexible connection between a provided debris hopper and the filter compartment to permit limited relative movement between the hopper and the compartment.

DESCRIPTION OF THE PREFERRED EMBODIMENT

Figure 1:
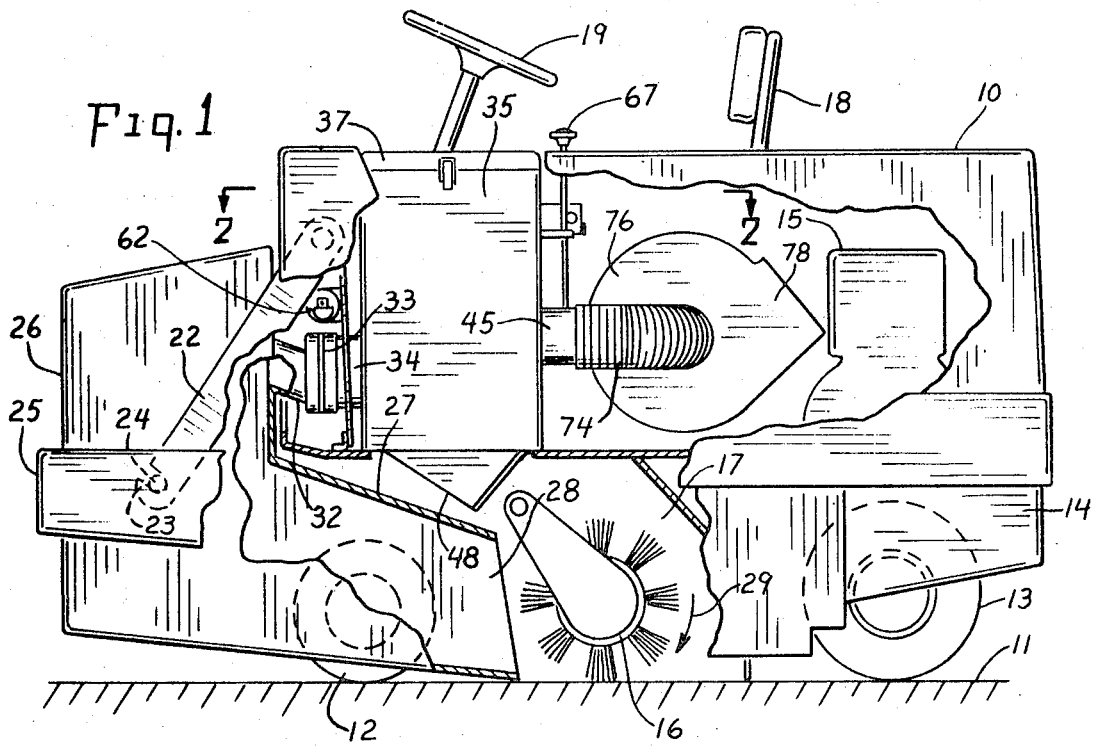
FIG. 1 is a side elevational view of a sweeping machine having a filter shaking arrangement made according to the present invention installed thereon.

A sweeping machine illustrated generally at 10 is of a mobile sweeping type which means that it will be propelled over a surface 11. It has front wheels 12 and a rear drive and steering wheel 13, both suitably mounted onto a frame 14 which supports the components for the machine.

An internal combustion engine 15, forming a source of power is mounted on the frame and is used for driving a suitable hydraulic motor (not shown) for propelling the wheel 13 and moving the entire machine. The engine 15 is also used for driving a rotary brush 16 which is suitably mounted in a brush housing or compartment 17 substantially midway between the front and rear wheels 12 and 13, respectively. The brush is rotatably mounted about a transverse axis. An operator's seat 18 is provided, and a steering wheel 19 is also provided. The steering wheel is used for steering the rear wheel 13.

A pair of lift arms 22 mount on the machine so that they will rotate with a mounting member (they are usually mounted onto a rockshaft to thereby be raised or lowered) and the lower portions are provided with notches shown in dotted line at 23 into which support pins shown at dotted lines 24 can be pivotally mounted. The support pins 24 are attached to a frame 25 and which in turn supports a debris dirt hopper or compartment 26. The hopper 26 as shown has a rearwardly extending inlet portion 27 that has a transverse inlet opening 28 communicating with the brush chamber and positioned so that the brush 16, when it is brushing and rotating in direction indicated by the arrow 29, will sweep material from the surface 11 into the inlet opening. Of course, fine dust will also be raised by the sweeping action. A vacuum created airflow is provided in order to control the dust. The debris hopper 26 has an air outlet tube 32 that sealingly fits within a provided opening in a resilient coupling member 33 mounted over an inlet tube 34 for a filter compartment or housing shown generally at 35. The coupling member is much like a flexible diaphragm covering the end of the tube 34. The filter compartment comprises a closed housing 36 having a removable cover 37. A plurality of depending filter bags 38 are mounted in the interior. The filter bags 38 are relatively thin pockets made of a suitable cloth material and are filled with an open weave plastic fiber mat or filler that keeps the large side walls of the filter bags spaced apart when the interior is subjected to a vacuum. The filter bags are closed around their periphery except at the ends illustrated at 42 where they each communicate with a plenum chamber 43. The plenum chamber is surrounded by edge members made of cloth that are sewn to the filter bags. The edge members make a peripheral rim around the ends of the filter bags adjacent a rear wall 44 of the housing 36. The rear wall 44 has an opening defined therein and this opening is surrounded by a clean air outlet tube 45. A framework 46 made of a metal which forms a rectangular frame fits around the peripheral edges of the cloth edge member making up the edges of the plenum chamber and seals the edges of the plenum chamber to the rear wall 44. This frame is bolted to the rear wall 44 with suitable fasteners such as those shown at 47. This clamps and seals the complete filter bag assembly against the rear wall, so that the plenum chamber 43 is sealed. The only way that air may flow through the tube 32 and into tube 34 of the filter compartment and then flow out through the opening surrounded by tube 45 is to have this air pass through the walls of the filter bags to get into the plenum chamber 43 and then out through the tube 45. This means that any dust being carried by this air when it enters the filter compartment will be deposited on the outer side wall surfaces of the filter bags and the dust will not be carried further.

The filter compartment 36 has a bottom portion 48 with a pivot mounted door 49 that as shown can be opened and closed manually from an external manual control so that any dust that deposits from the filter bag can be dropped downwardly into the brush chamber ahead of the brush 16 (in its path of travel) and swept into the compartment or chamber 26.

Figure 2:
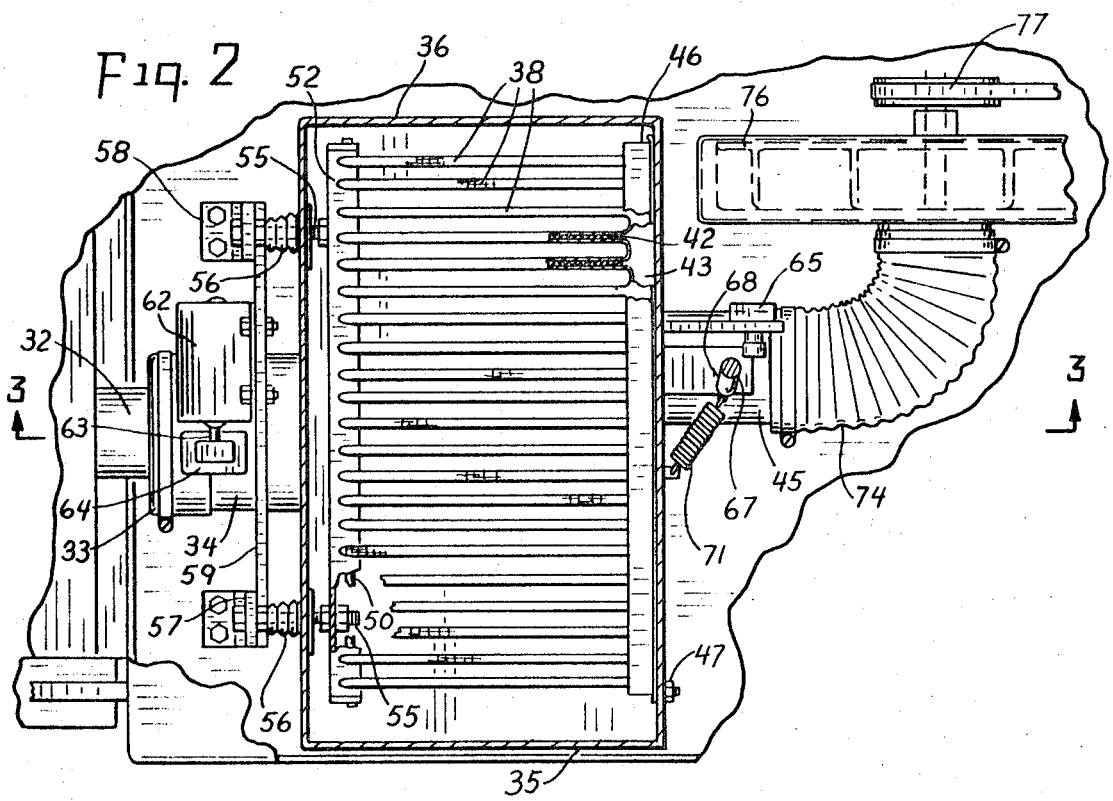
FIG. 2 is a fragmentary enlarged sectional view taken at a line 2—2 of FIG. 1.
Figure 3:
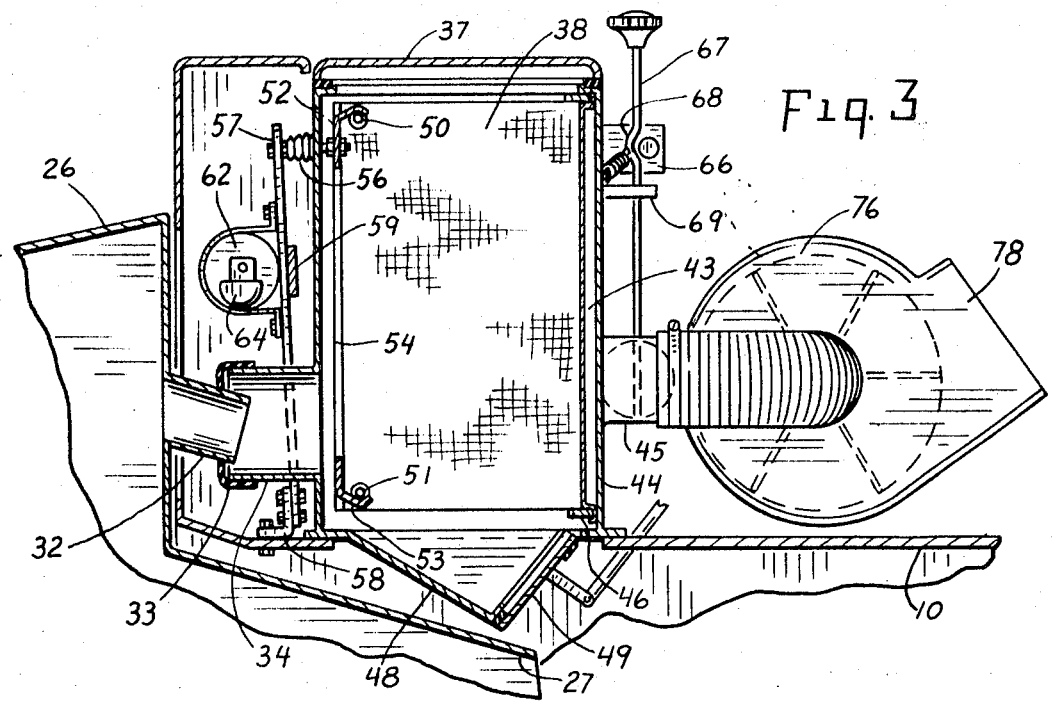
FIG. 3 is a sectional view taken as of line 3—3 in FIG. 2.

The front edge portions of the filter bags are mounted onto two transverse rods 50 and 51, respectively, one at the top and one at the bottom which extend transversely across the filter bags and these rods are mounted through provided openings in each of the filter bags. The opening in the bags have grommets so that the bags are sealed around these openings. The rods in turn are connected to a top frame member 52 and a bottom frame member 53, respectively. The top and bottom frame members 52 and 53 are connected to vertical frame members 54 on opposite sides to make a rectangular frame surrounding the filter bag assembly. The frame is open in the front except for the side members and top and bottom frame members. A pair of bolts 55 are attached with lock nuts to the top frame member 52 at spaced locations as shown in FIG. 2 and extend through a forward wall of housing 36. A sealing boot 56 surrounds the bolts on the outside of the wall. These bolts 55 are then each attached to a separate one of a pair of upright leaf springs 57, 57 which are spaced transversely apart and are fastened with suitable brackets 58 to the frame of the machine. A cross piece 59 holds the members 57 together to form a framework. An electric motor 62 is mounted with suitable members onto the crosspiece 59. The motor has an output shaft 63 that has an eccentric weight 64 mounted thereon so that it will drive when the motor shaft rotates. Springs 57 are made so that they exert a tension force on the filter bags 38 through the bolts 55 and bracket 52 to hold the filter bags taut in direction along the planes of the bags. The rearward end of the filter bags of course are held by the frame 46 which goes around the periphery of the plenum chamber as explained previously.

Figure 5:
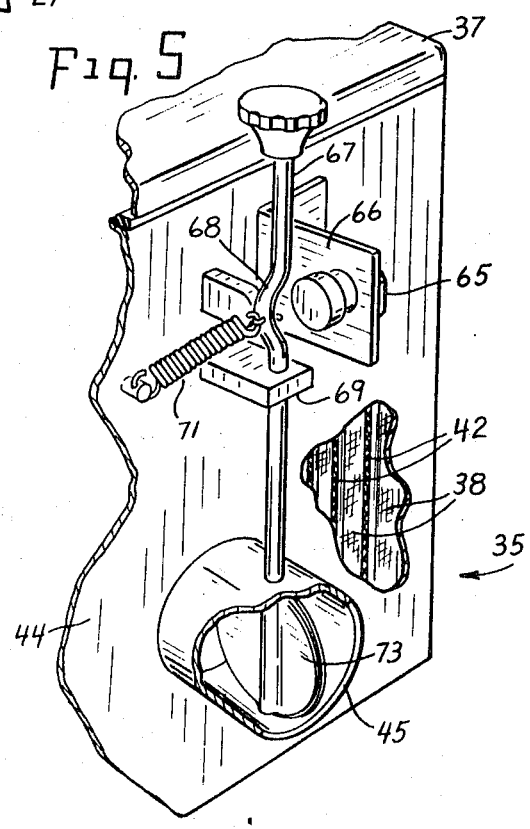

The motor 62 is powered from the battery or suitable electric source (not shown) in a conventional manner through a control switch 65. The switch is an ordinary on-off electric sWitch which has a spring return to the off position. The switch 65 is mounted onto a bracket 66 which in turn is fastened to the exterior of the rear wall 44 of the filter compartment. A shaker control rod assembly 67 is rotatively mounted in a bracket 69 also attached to the rear wall 55 of the machine and comprises a rod having an offset portion 68 that is in alignment with the actuator button of switch 65. The offset portion 68 has a return spring 71 attached thereto with suitable means, and the spring is also attached as at 72 to the rear wall of the filter compartment. The spring 71 tends to return the control rod 67 to its initial "off" position as shown in FIG. 5. The lower portions of the control rod rotatably pass through the tube 45 and a butterfly valve 73 is mounted on the rod on the interior of the tube 45, the valve 73 is of size to close off the tube 45 when the butterfly valve is in closed position with the plane of the valve at right angles to the axis of the tube. In a normal position where the spring 71 has returned the control rod 67 to its off position the plane of the butterfly valve is parallel to the axis of tube 45 and air can flow through the tube freely.

Tube 45 has a flexible connection tube 74 connected thereto, and this connection tube 74 is also attached to the inlet of a vacuum blower 76, which has an interior impeller that is driven through a belt and pulley arrangement 77 from the motor 15. When the impeller is running air is exhausted out through portion 78. A vacuum is created at the inlet. Air is then drawn in from the inlet 28 of the hopper 26 and flows through the hopper 26, through tube 32, through tube 34, into the interior of the filter compartment, through the walls of the filter bags, into the plenum 43 and then out through tube 45. The clean air which has passed through the filter bags is exhausted out through the portion 78.

Figure 4:
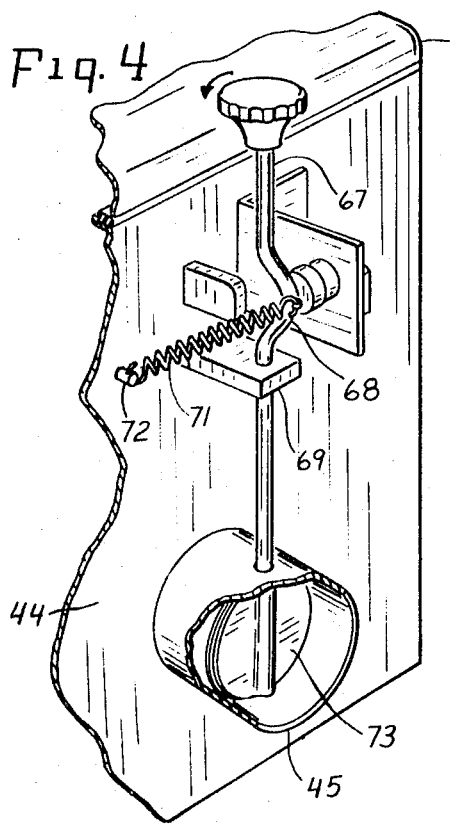
FIG. 4 is a fragmentary perspective view of the rear portions of the filter compartment of FIG. 3 showing a vibrator control in its actuated position; and, FIG. 5 is a perspective view taken substantially as FIG. 4 showing the control in unactuated or normal position.

After dust has accumulated on the exterior walls of the filter bags 38, because of the air flow from the exterior to the interior of the filter bags, and out through the vacuum blower, the operator will want to shake this dust off. Then, by rotating the control rod 67 in the direction indicated by the arrow in FIG. 4 until the offset portion 68 closes the switch 65 (the switch button extends through the bracket 66) butterfly valve 73 will close tube 45 to substantially shut off air flow tending to hold the dust against the sides of the filter bags. At the same time the motor 62 will be energized and the weight 64 will start to rotate causing violent vibration. The springs 57 emphasize its vibratory motion and shake the filter bags back and forth. Because the bolts 56 which are attached to the springs 57 also support the front frame member 52 under force from springs 57 the bags will actually be collapsed slightly and shaken back and forth very vigorously to make sure that all the dust is removed. Mounting the motor and weight at a position between bracket 58 and the bolts 57 magnifies the amplitude of vibration of the filter bags. Thus the filter bags are very violently shaken to remove all the dust and the cutting off of the air flow to the bags assures that this dust will drop downwardly into the portion 48 of the filter compartment so that the dust can be discharged by opening the door 49.

The flexible diaphragm like connection 33 is made so that the hopper 26 can float slightly about its pivot pins 24 without breaking the vacuum connection between the filter compartment and the hopper. In other words there will be an air flow through the hopper even if the rear or inlet portions 27 of the hopper raise slightly to permit obstructions to pass underneath. The flexible connection 33 will let the tube 32 slide relative to tube 34 a slight distance, which will be sufficient movement for normal operation of the machine. The vacuum or air flow will continue to be connected so that any dust in the hopper 26 will be carried through the filter bags and this will minimize any dust leakage from the machine.

The use of the remote filter compartment takes the bags out of the debris hopper itself, and mounts so that they can be shaken very vigorously. The filter compartment is attached directly to the frame portions of the machine, and the cover 37 is handy for access to the compartment.

The opening from the filter compartment, as shown closed by door 47, can be arranged to dump directly into a removable dust tray mounted on the frame, rather than into the brush path. The tray can then be emptied as desired. Also, a disposable bag could be used for receiving the material deposited on the floor of the filter housing. The discharge opening and door also could be rearranged to dump directly into the hopper 36 if desired.

The mounting of the bags under tension, as described, keeps the filter bags taut during operation. This prevents the sides of the bags from billowing out and touching the sides of adjacent bags. When adjacent bags touch, the area of contact is blocked off and the filtering area is reduced.

The filter mounting and shaking arrangement has been shown in connection with mobile sweeping machines where the structure finds its greatest utility, but the filter structure can be used in stationary dust collectors or filtering arrangements as well.

What is claimed is:

1. In a mobile surface maintenance machine having a surface maintenance tool mounted thereon, a debris compartment for receiving material from said surface maintenance tool, a filter compartment, and means for creating an airflow from adjacent said surface maintenance tool through said debris compartment and into said filter compartment, the improvement comprising connection means to carry air flow between said filter compartment and said debris compartment, said debris compartment having a first tubular member extending from one wall thereof and open to the interior thereof, said filter compartment having a second tubular member extending therefrom and forming an air flow inlet thereto, one of said tubular members being of larger size than the other tubular member and surrounding at least a portion of the other tubular member, a flexible diaphragm having its outer periphery attached to the larger tubular member, said diaphragm having an opening in the center portions thereof of size to sealingly receive the smaller tubular member and to thereby permit relative movement between the two tubular members without breaking the air flow connection between the filter compartment and the debris compartment.

2. The sweeping machine of claim 1 wherein said filter compartment is mounted above said surface maintenance tool, and wherein said surface maintenance tool is a sweeping brush, said filter compartment having a bottom surface inclined with respect to a horizontal plane, a door member positioned along one edge of said bottom surface substantially above and in the path of sweeping of said brush, and means to permit opening said door member to discharge dust and debris from said filter compartment to the path of movement of said sweeping brush.

3. The combination as specified in claim 1 and means to pivotally mount said dust and debris receptacle for limited pivotal movement with respect to said filter compartment.

* * * * *

UNITED STATES PATENT OFFICE
CERTIFICATE OF CORRECTION

Patent No. 3,747,156          Dated July 24, 1973

Inventor(s) Alfred D. Carlson et al

It is certified that error appears in the above-identified patent and that said Letters Patent are hereby corrected as shown below:

In the Title "Filter Chamber for Scraping Machine" should be --Filter Chamber for Sweeping Machine--; Column 3, line 52 "55" should be --44--.

Signed and sealed this 1st day of January 1974.

(SEAL)
Attest:

EDWARD M. FLETCHER, JR.
Attesting Officer

RENE D. TEGTMEYER
Acting Commissioner of Patents